United States Patent
Stevens et al.

[15] 3,701,136
[45] Oct. 24, 1972

[54] SYSTEM FOR DETECTING THE POSITION OF A MOVABLE ELEMENT

[72] Inventors: Curtis E. Stevens, Irvine; Chandler A. Phillips, La Canada, both of Calif.

[73] Assignee: Bertea Corporation, Irvine, Calif.

[22] Filed: July 14, 1969

[21] Appl. No.: 841,489

[52] U.S. Cl. .................. 340/199, 336/30, 336/132, 340/210
[51] Int. Cl. ........................................... G08c 19/00
[58] Field of Search ........340/199, 196, 195; 336/30, 336/132

[56] References Cited

UNITED STATES PATENTS

| | | | |
|---|---|---|---|
| 2,495,157 | 1/1950 | Browne | 340/199 |
| 2,640,971 | 6/1953 | MacGeorge | 340/196 |
| 2,785,356 | 3/1957 | Nisle | 340/199 |
| 3,181,055 | 4/1965 | Bischof | 340/199 |
| 3,502,967 | 3/1970 | Bridges et al. | 340/199 |
| 2,749,534 | 6/1956 | Threadgold | 340/177 |

Primary Examiner—John W. Caldwell
Assistant Examiner—Robert J. Mooney
Attorney—Smyth, Roston & Pavitt

[57] ABSTRACT

The system includes a position transducer connectible to an ac power supply for providing an electrical signal which is a function of the position of a movable member. The position transducer divides the ac input into at least two components with each component being a function of the position of the movable member. There is an average dc level of the ac signal in accordance with the relationship between the two components of the ac signal. A suitable crossover network separates the dc level from the ac and an indicator provides an indication of the position of the movable element in response to the dc level.

9 Claims, 2 Drawing Figures

PATENTED OCT 24 1972

3,701,136

INVENTORS:
Curtis E. Stevens
Chandler Phillips

ATTORNEYS 3,701,136

SYSTEM FOR DETECTING THE POSITION OF A MOVABLE ELEMENT

BACKGROUND OF THE INVENTION

It is often necessary to accurately ascertain the position of a remotely located movable member and this function is often performed by a position transducer which is located closely adjacent the movable member. The transducer may be responsive to the position of the movable member to provide an electrical signal which varies with the position of the member. This signal is conducted to a designated location remote from the movable member where it is transformed into an indication of the position of the movable member.

Initially transducers of this type included a position sensing potentiometer. However, the problems associated with moving contacts on the potentiometer led to the development of transducers having movable core magnetic elements.

One such position transducer includes an ac power supply connected to a coil having a movable core. Core position is a function of the position of the movable element and current flow in the circuit is a function of core position. The problems of high drift and low gain which were associated with this transducer led to the development of other more complex systems which solved these problems but introduced new problems such as noise and common mode rejection.

An additional problem with these other systems is the requirement that three or more conductors be used to interconnect the indicator, the power supply and the remotely positioned transducer. Because the transducer is remotely located, these conductors must be of substantial length. The use of three or more conductors is particularly undesirable for aircraft applications where the additional weight of the extra conductors can significantly increase the weight penalty. Furthermore, regardless of the environment in which the transducer is used, the additional conductors increase material cost and the complexity of the system.

SUMMARY OF THE INVENTION

The present invention provides a system for detecting the position of a movable member which requires only two conductors leading to the transducer and which eliminates the problems of noise, low gain, high drift and common mode rejection of the several prior art systems. The system of this invention may be used for any application in which it is desired to use electrical signals to monitor positions. This includes secondary measurements where the position of the member is itself a function of acceleration, velocity, pressure, flow, etc.

The present invention uses an ac power supply and divides the ac into at least two components with the dc level of the ac signal being a function of the position of the movable element. Thus, the ac signal may be considered to be the carrier and the dc level may be considered to be the information signal. A suitable crossover network separates the information signal from the carrier and an indicator such as an ammeter or a voltmeter provides an indication of the position of the movable member. Only two conductors connect the power supply with the transducer and the indicator can be suitably connected to either of the conductors at a position remote from the position transducer. The ac power supply must be capable of passing dc.

The dc level has one polarity when the core moves in one direction from null and the opposite polarity when the core moves in the other direction from null. Thus, the polarity of the dc level indicates the direction in which the core is displaced from the null position. The amplitude of the signal indicates the amount that the core is displaced from the null position. The value of the dc level is varied by a variable impedance which preferably includes an inductive coil with variable coupling.

With the present invention, first and second electrically conductive paths are provided between the two conductors which are connected to the ac power supply. Each of the paths is rendered more conductive in one direction than the other by means of a non-linear impedance such as a rectifier. At least one of the paths has a variable impedance, the magnitude of which is a function of the position of the movable member. Thus, the current flowing through the conductors has an average value which is a function of the value of the variable impedance. By measuring the average value of the current, the position of the movable element can be ascertained. Preferably each path has a variable impedance so that external factors such as temperature will affect both impedances in the same manner thereby preventing such external factors from affecting the dc level.

The invention, both as to its organization and method of operation, together with further features and advantages thereof, may best be understood with reference to the following description taken in connection with the accompanying drawing.

DESCRIPTION OF THE PREFERRED EMBODIMENT

Figure 1:
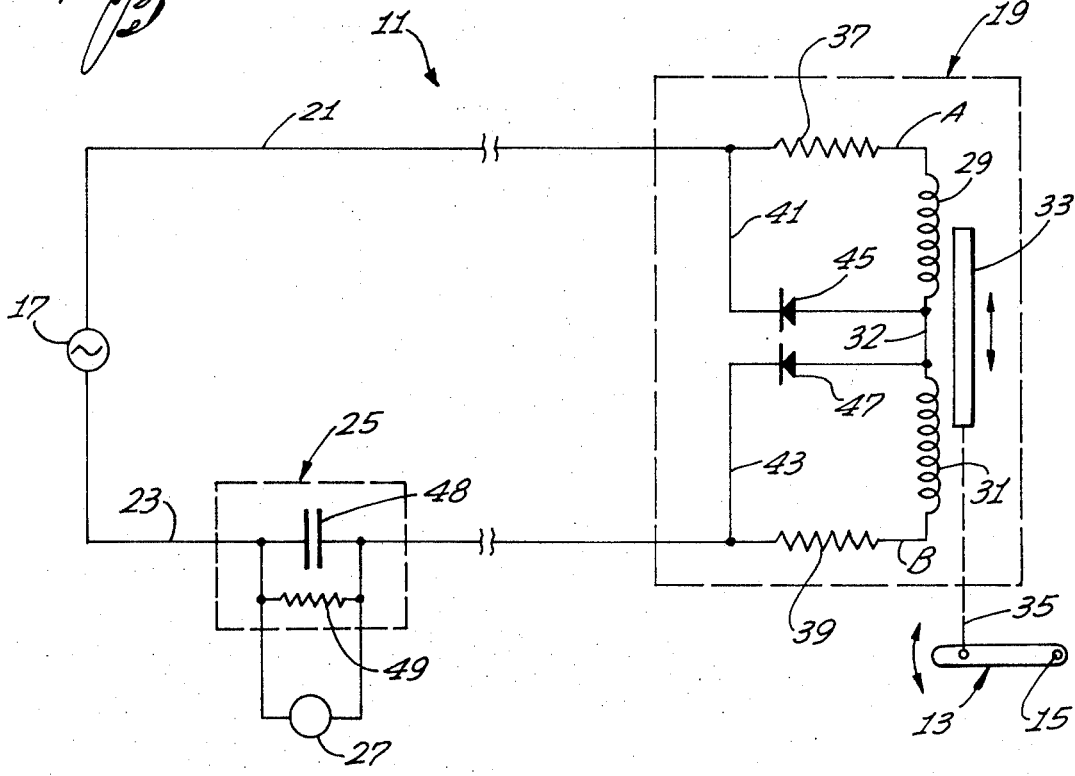
FIG. 1 is a schematic circuit diagram of one position detecting system constructed in accordance with the teachings of this invention.

Referring to the drawings and in particular to FIG. 1 thereof, reference numeral 11 designates a system for detecting the position of a movable element 13. Although the movable element 13 is mounted for pivotal movement about an axis 15, it should be understood that the system 11 is useable to detect the position of members whose movement is angular, linear, or both of these. The element 13 may be any element, the position of which it is desired to monitor.

Generally the system 11 includes an ac power source 17, a position transducer 19 electrically connected to the power source by a pair of conductors 21 and 23, a crossover network 25, and an indicator 27. The ac power supply must be capable of passing direct current.

The transducer 19 includes windings 29 and 31 connected in series by a conductor 32 across the conductors 21 and 23. The inductive reactance of the windings 29 and 31 is variable by a movable core 33. The position of the core 33 is a function of the position of the movable element 13, and this relationship can be established by any suitable means such as a mechanical linkage 35 drivingly connecting the member 13 to the movable core 33. Alternatively, the core 33 may be fixed and the magnetic permeability of the core can be varied in response to movement of the movable element 13. This can be accomplished, for example, by a rotary core or a flexing diaphragm.

Resistors 37 and 39 are provided in the conductors 21 and 23, respectively. The resistors 37 and 39 are in series with the winding 29 and 31, respectively, and perform a current limiting function.

A conductor 41 extends between the conductor 21 and the conductor 32 and provides a conductive path around the resistor 37 and the winding 29. A similar conductor 43 is similarly connected around the resistor 39 and the winding 31. Diodes 45 and 47 are provided in the conductors 41 and 43, respectively. Each of the diodes 37 and 39 may be any nonlinear rectifying device such as selenium, copper oxide, germanium, silicon, gallium arsenide, silicon carbide, vacuum or gaseous rectifiers.

The transducer 19 provides two primary unidirectional conductive paths A and B between the conductors 21 and 23. Thus, during the positive portion of the cycle, current flows in the path A through the resistor 37, the winding 29 and the diode 47. There is also some minor current flow through the winding 31 and the resistor 39. Conversely, during the negative portion of the cycle, the current flows in the path B through the resistor 39, the winding 31 and the diode 45. A minor portion of the current flows through the winding 29 and the resistor 37.

The amount of current flowing through the paths A and B is, of course, a function of the impedance of the respective paths. At the zero or null position of the member 13 the impedances of the paths A and B should be equal. Ideally this can be accomplished if the resistances of the resistors 37 and 39 are equal, the windings 29 and 33 are identical and the core 33 is similarly positioned relative to the windings. Practically, however, it may be necessary to adjust the resistances of the resistors in order to obtain a fine adjustment of the null position.

Figure 2:
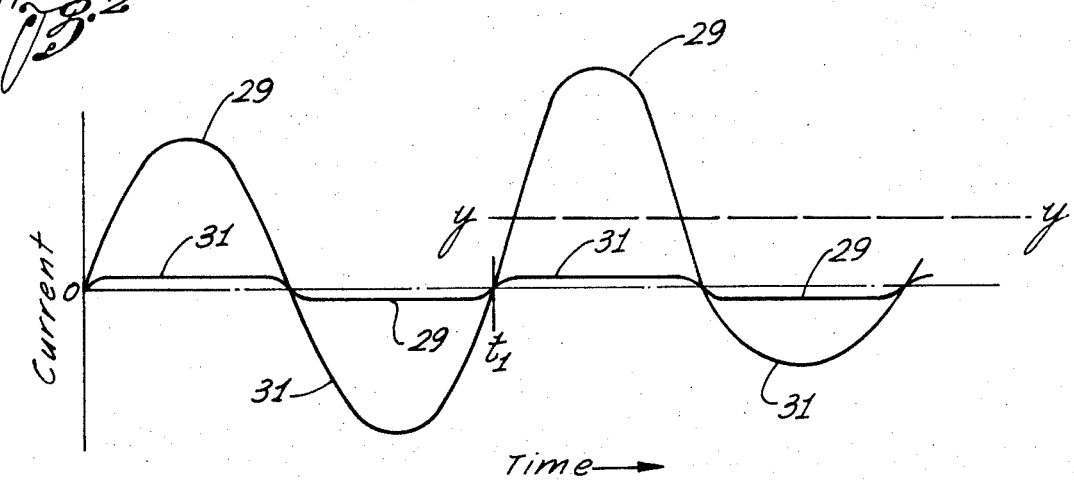
FIG. 2 is a plot illustrating the effect of movement of the movable element on the current flowing in the circuit of FIG. 1.

FIG. 2 shows current flow in the windings 29 and 31. Thus, during the positive portion of the cycle there is relatively high current flow in the winding 29 and minor current flow in the winding 31 while during the time that current flows in the reverse direction, this condition reverses. As the impedances of the paths A and B are equal in the null position, the current flow through each of the paths is equal with the result that the current wave flowing through the conductors 21 and 23 is a sine wave as illustrated, for example, by the portion of the curve in FIG. 2 between zero and t1. Similarly, the minor current flow through each of the minor paths as represented by the small amplitude curves in FIG. 2 are equal. This causes the dc or average current to be zero, and in the embodiment illustrated, this is indicative of the null position of the movable member 13.

Assuming that the movable member 13 is pivoted counterclockwise as viewed in FIG. 1, the movable core 33 is simultaneously moved downwardly to decrease the inductive reactance of the winding 29 and increase the inductive reactance of the winding 31. The effect on current flow is two-fold. First, because of the decrease in the inductive reactance of the winding 29, the current flowing through the winding 29 on the positive portion of the cycle is increased as shown by the maximum amplitude curve in FIG. 2. Secondly the increase in the inductive reactance of the winding 31 causes the current flowing during the negative portion of the cycle to decrease. This produces dc or average current flow out of the transducer 19 as indicated by the line y—y in FIG. 2. As shown in FIG. 2, the dc or average current is a positive value greater than zero. Although the current flow through the windings 29 and 31 during the negative and positive cycles, respectively, will change, such current flow is negligible relative to the current flow through the paths A and B.

If the core 33 were displaced upwardly from the null position, the current flowing during the positive portion of the cycle would decrease and the current flowing during the negative portion of the cycle would increase with the result that the dc or average current flow would be negative. Thus, in the embodiment illustrated, polarity of the signal indicates the direction of movement of the core 33 from the null position.

The core 33 is not saturated and, therefore, the change in inductive reactance of the windings 29 and 31 is directly proportional to the movement of the core and the movable member 13. Accordingly, the transducer 19 provides a linear output which is a function of the position of the core 33 and the movable member 13.

The windings 29 and 31, the diodes 45 and 47, and the resistors 37 and 39 divide the alternating current input from the power source 17 into two components. The dc level varies in accordance with the amplitude of the two components as shown by the portion of the curve in FIG. 2 to the right of the time $t1$. The ac input may serve as the carrier and the dc level may serve as the information signal.

As the average value of the current flow through the conductors 21 and 23 represents the position of the movable element 13, it is necessary to separate the dc information signal from the carrier. Any suitable arrangement for measuring the dc or average value of the current can be utilized. In the embodiment illustrated, this function is performed by the cross-over network 25 which takes the form of an RC circuit. The crossover network 25 includes a capacitor 48 connected in series in the line 23 and a resistor 49 connected in parallel across the capacitor 48. The capacitor 48 will pass only the ac portion of the current while forcing the dc to flow through the resistor 49.

The indicator 27 may be any suitable measuring device which can provide an indication which corresponds to the magnitude and polarity of the direct current flowing in the conductors 21 and 23. Although the indicator 27 may be an ammeter, in the embodiment illustrated, it is a voltmeter which is connected in parallel across the resistor 49 and measures the voltage drop thereacross. The voltage drop across the resistor 49 is, of course, proportional to the direct current flowing in the conductor 23 and as such can accurately represent the position of the movable element 13. The dc level can also be used to operate an amplifier or a position feedback device all of which may be considered to provide an indication of the position of the movable member.

During use of the system 11 environmental conditions such as temperature may change, and in addition the windings 31 and 33 and the resistors 37 and 39 will be heated due to the current passed therethrough. This, of course, affects the amount of current which flows in the system. The system 11 provides some inherent compensation for temperature changes in that, with the member 13 at the null position, a corresponding temperature increase in the windings 31 and 33 and the resistors 37 and 39 causes corresponding decreases in the current flowing during each half cycle so that there is no change in the dc level.

For optimum results and to maintain the same gain over a wide temperature range, the resistors 37 and 39 preferably have negative temperature coefficient of resistance. As external conditions or current flow heats the winding 31, the resistance thereof increases. However, the resistor 39 will be heated a corresponding amount so that the resistance of the resistor 39 will drop an amount sufficient to compensate for the increase in resistance of the winding 31 with the result that current flow in the path B is the same for a given position of the member 13 regardless of temperature conditions. Of course, the same result is obtained in the path A with the consequent advantage that each position of the member 13 is represented by a given dc level regardless of temperature. Suitable resistors having the appropriate compensating negative resistor coefficient can be selected by one who is skilled in the art. Likewise resistors responsive to other parameters of the environment, such as power supply voltage or frequency or nuclear radiation, may be used to compensate for changes in the variable impedances due to those same parameters.

Although an exemplary embodiment of the invention has been shown and described, many changes, modifications, and substitutions may be made by one having ordinary skill in the art without necessarily departing from the spirit and scope of this invention.

We claim:

1. A system for detecting the position of a movable element and electrically connectible by first and second conductors to an alternating current power source capable of passing direct current, said system comprising:

first and second electrically conductive paths extending between said conductors;

means in said first path for blocking current flow from said second conductor to said first conductor and for permitting current to flow through said first path from said first conductor to said second conductor;

means in said second path for blocking current flow from said first conductor to said second conductor and for permitting current to flow through said second path from said second conductor to said first conductor;

a first impedance in said first path to impede the flow of current therethrough;

a second impedance in said second path for impeding the flow of current therethrough, said second impedance including a variable impedance for varying the current flow through said second path whereby the current flowing through the conductors has an average value which is a function of the value of said first and second impedances;

means responsive to movement of the movable element for varying the variable impedance so that the value of the variable impedance corresponds to the position of the movable element, the varying of the impedance of the variable impedance causing a corresponding variation in the average value of the current flow through said conductors whereby the amplitude of the average value is a function of the position of the movable element;

means coupled to at least one of said conductors intermediate the alternating current power source and both of said paths and responsive to said average value for providing an indication of the position of the movable element; and said first impedance including a variable impedance, said system including means responsive to movement of the movable element for varying the last mentioned variable impedance so that the value of the last mentioned variable impedance corresponds to the position of the movable element with the value of the impedance of the last mentioned variable impedance varying inversely with the value of the impedance of the first mentioned variable impedance.

2. A system as defined in claim 1 wherein said first impedance includes a first resistance and said second impedance includes a second resistance.

3. A system as defined in claim 2 wherein each of said resistances has resistance characteristics responsive to an environmental parameter.

4. A system as defined in claim 1 wherein each of said variable impedances includes an inductive coil and a core adjacent said coil, and each of said means responsive to movement of the movable element includes means drivingly connected to the movable element for moving the core relative to the coil.

5. A system for monitoring a variable condition, such system being connectible by first and second conductors to an alternating current power source capable of passing direct current, said system comprising:

first and second electrically conductive paths extending between said conductors;

means in said first path for blocking current flow from said second conductor to said first conductor and for permitting current to flow through said first path from said first conductor to said second conductor;

means in said second path for blocking current flow from said first conductor to said second conductor and for permitting current to flow through said second path from said second conductor to said first conductor;

a first impedance in said first path to impede the flow of current therethrough;

a second impedance in said second path for impeding the flow of current therethrough, said second impedance including a variable passive impedance for varying the current flow through said second path whereby the current flowing through the conductors has a dc level which is a function of the value of said first and second impedances;

means responsive to the variable condition for varying the variable passive impedance so that the value of the variable passive impedance is related to the variable condition, the varying of the variable passive impedance causing a corresponding variation in the dc level of the current flow through the conductors whereby the amplitude of the dc level is a function of the variable condition; and means adapted for coupling to at least one of the conductors intermediate the alternating current power source and both of said paths and responsive to said dc level for providing an indication of the variable condition.

6. A system as defined in claim 5 wherein said first impedance includes a variable passive impedance, said system including means responsive to the variable condition for varying the last mentioned variable passive impedance so that the value of the last mentioned variable passive impedance corresponds to the condition of the variable condition with the value of the impedance of the last mentioned variable passive impedance varying inversely with the value of the impedance of the first mentioned variable passive impedance.

7. A system as defined in claim 5 wherein said means in said first path includes a first diode and said means in said second path includes a second diode.

8. A system as defined in claim 5 wherein each of said first and second electrically conductive paths is devoid of amplifying devices.

9. A system as defined in claim 5 wherein said variable passive impedance includes an inductor and said means responsive to the condition of the variable condition varies the inductive reactance of said inductor.

* * * * *